(12) United States Patent
Kouma et al.

(10) Patent No.: US 9,182,031 B2
(45) Date of Patent: Nov. 10, 2015

(54) V-BELT TYPE CONTINUOUSLY VARIABLE TRANSMISSION

(71) Applicant: KAWASAKI JUKOGYO KABUSHIKI KAISHA, Hyogo (JP)

(72) Inventors: Yuji Kouma, Takasago (JP); Seiji Itoo, Akashi (JP); Taisuke Morita, Amagasaki (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 293 days.

(21) Appl. No.: 13/729,797

(22) Filed: Dec. 28, 2012

(65) Prior Publication Data

US 2014/0187366 A1      Jul. 3, 2014

(51) Int. Cl.
| *F16H 9/16* | (2006.01) |
| *F16H 57/035* | (2012.01) |
| *F16H 57/031* | (2012.01) |
| *F16H 57/02* | (2012.01) |

(52) U.S. Cl.
CPC ............ *F16H 57/035* (2013.01); *F16H 57/031* (2013.01); *F16H 2057/0203* (2013.01); *F16H 2057/02056* (2013.01)

(58) Field of Classification Search
CPC ................ F16H 57/035; F16H 57/031; F16H 2056/0203; F16H 2056/02056
USPC ..................... 474/8, 150, 148; 477/37, 44–46
See application file for complete search history.

(56) References Cited

U.S. PATENT DOCUMENTS

| 1,498,166 | A | * | 6/1924 | Heimlich et al. ............ 188/249 |
| 1,704,890 | A | * | 3/1929 | Gerson ......................... 74/343 |
| 6,338,688 | B1 | * | 1/2002 | Minami et al. ............... 474/144 |
| 6,398,683 | B1 |   | 6/2002 | Fukuda |
| 6,544,134 | B2 | * | 4/2003 | Ohyama et al. .............. 474/144 |
| 7,281,596 | B2 | * | 10/2007 | Fukuda ........................ 180/68.2 |
| 7,281,603 | B2 | * | 10/2007 | Fukuda ........................ 180/357 |
| 7,303,495 | B2 | * | 12/2007 | Schoenek et al. ............ 474/144 |
| 2005/0272544 | A1 | * | 12/2005 | Ho ............................... 474/144 |
| 2013/0087403 | A1 | * | 4/2013 | Itoo et al. ..................... 180/339 |
| 2014/0187365 | A1 | * | 7/2014 | Kouma et al. ..................... 474/8 |
| 2014/0187366 | A1 | * | 7/2014 | Kouma et al. ..................... 474/8 |
| 2014/0187372 | A1 | * | 7/2014 | Kouma et al. ................ 474/150 |
| 2014/0274515 | A1 | * | 9/2014 | Takahashi et al. ............ 474/150 |

* cited by examiner

*Primary Examiner* — Sang Kim
*Assistant Examiner* — Michael Riegelman
(74) *Attorney, Agent, or Firm* — Wenderoth, Lind & Ponack, L.L.P.

(57) ABSTRACT

In a V-belt type continuously variable transmission for utility vehicle, a transmission case assembly covering a drive pulley assembly and a driven pulley assembly is provided. The transmission case assembly includes a transmission case main body, and a transmission cover attached to a cover attachment surface of the transmission case main body. The cover attachment surface is inclined with respect to a vertical plane which is orthogonal to a crankshaft, and the transmission cover is attached to the cover attachment surface by a plurality of bolts removed and inserted in the direction orthogonal to the cover attachment surface.

7 Claims, 7 Drawing Sheets

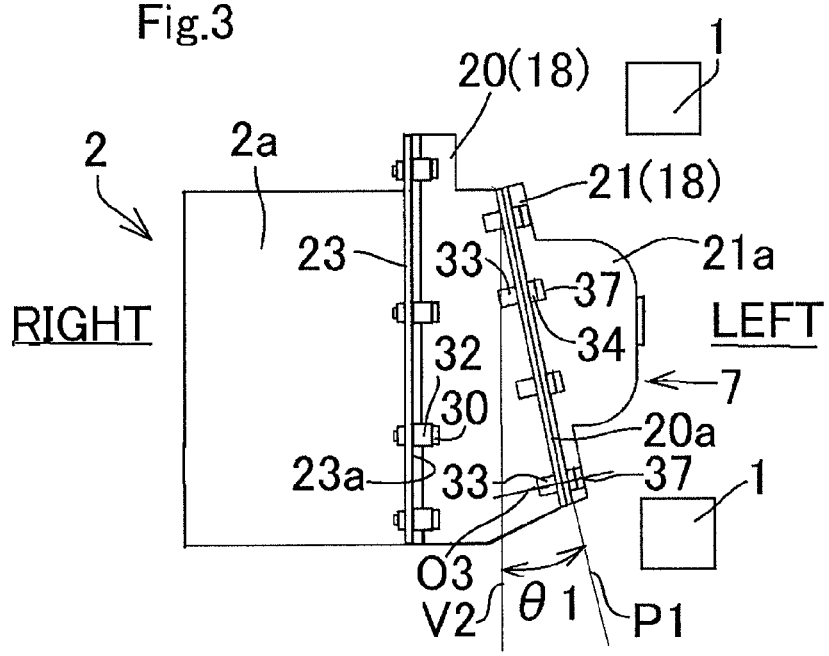
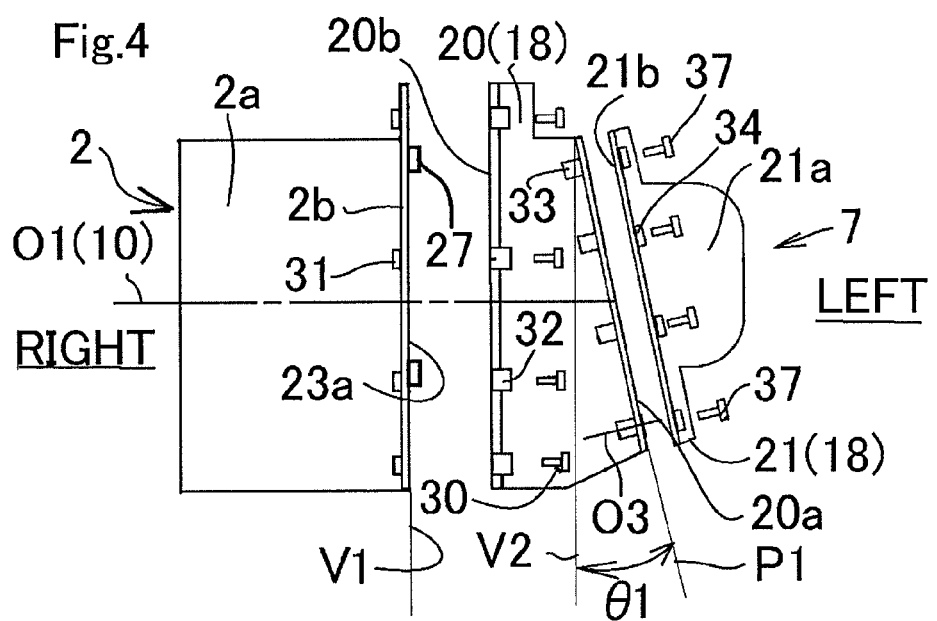

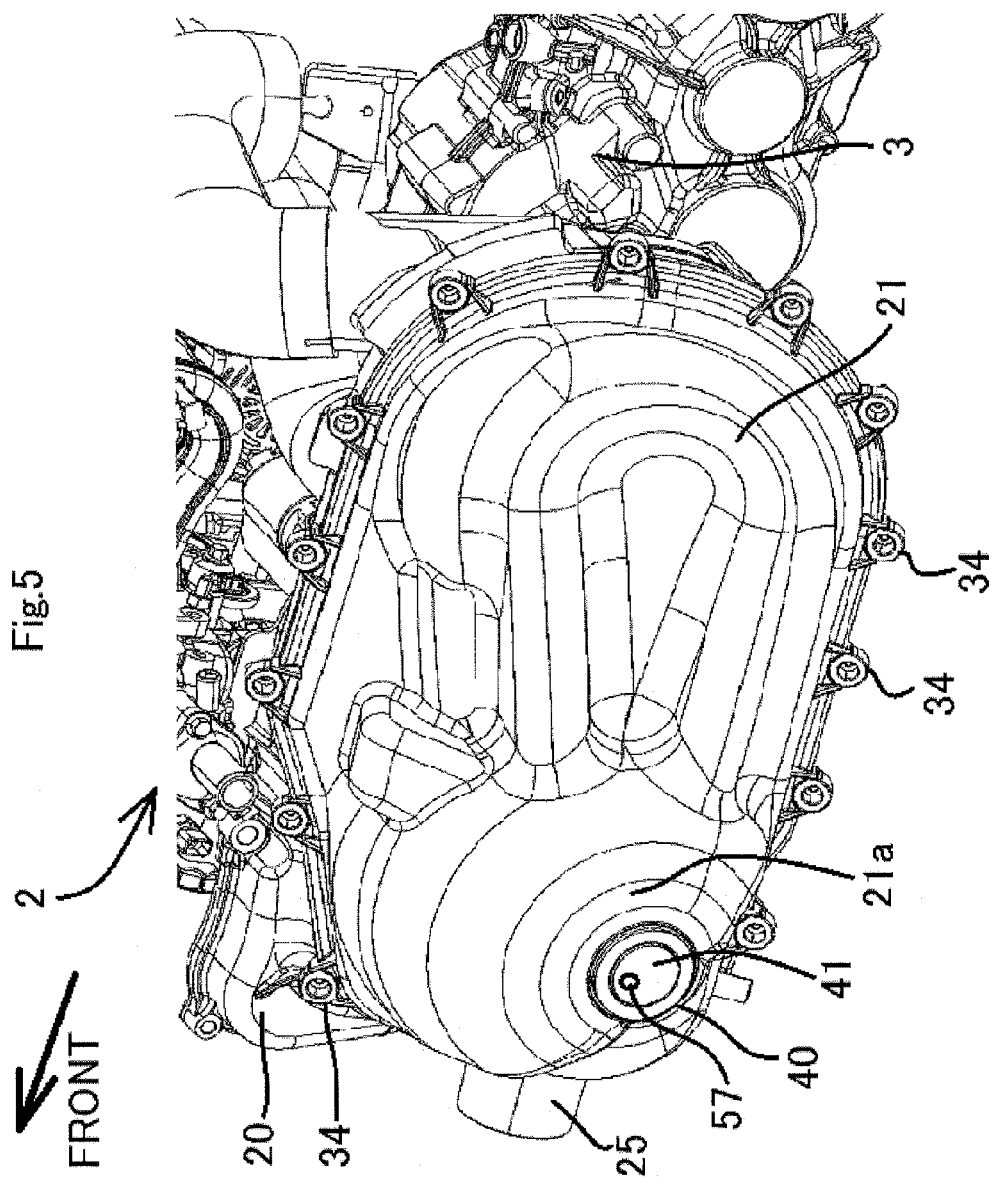

V-BELT TYPE CONTINUOUSLY VARIABLE TRANSMISSION

BACKGROUND OF THE INVENTION

1. Field of the Invention

The present invention relates to a V-belt type continuously variable transmission for utility vehicle to be coupled to a crankshaft of an engine so as to transmit motive power.

2. Description of the Related Art

U.S. Pat. No. 6,398,683 B1 discloses a conventional structure of a V-belt type continuously variable transmission to be mounted in a utility vehicle, in which a transmission case is integrated with a crankcase on one end surface of the crankcase of an engine in the crankshaft direction, and a transmission cover is attached to a cover attachment surface of the transmission case by bolts. The cover attachment surface of the transmission case is formed in a vertical plane which is orthogonal to a substantially horizontal crankshaft. Therefore, when the transmission cover is attached to and detached from the cover attachment surface, the plurality of bolts is inserted into and removed from boss portions formed in the transmission cover in the horizontal direction, from the side of the vehicle.

However, in a case where pipe members of a vehicle body frame or vehicle parts or the like exist in the vicinity of the boss portions of the transmission cover, those parts and the bolts are brought into contact with each other in a case of inserting and removing the bolts, so that attachment and detachment tasks of the transmission cover are troublesome. Particularly, in the utility vehicle, the engine and the V-belt type continuously variable transmission are accommodated in a narrow chassis. Thus, difficulty of the attachment and detachment tasks of the bolts and the transmission cover is unavoidable.

Meanwhile, when the V-belt type continuously variable transmission is arranged in such a manner that the bolt insertion boss portions of the transmission cover are away from other parts, spaces for removing and inserting the bolts are generated, so that size of the vehicle is increased.

SUMMARY OF THE INVENTION

The present invention is achieved in consideration with the above problem, and an object thereof is to provide a V-belt type continuously variable transmission capable of allowing a vehicle to be compact. Furthermore, at the time of attaching and detaching a transmission cover of the V-belt type continuously variable transmission, bolts are not brought into contact with other parts, and maintenance and replacement of a V belt are easily performed.

In order to achieve the above object, the V-belt type continuously variable transmission according to the present invention is a V-belt type continuously variable transmission arranged in one end in the vehicle width direction of an engine having a crankshaft which is parallel to the vehicle width direction, including a transmission case assembly covering a drive pulley assembly and a driven pulley assembly. The transmission case assembly includes a transmission case main body provided in one end of a crankcase in the vehicle width direction, and a transmission cover attached to a cover attachment surface of the transmission case main body. The cover attachment surface is formed in one plane inclined in such a manner that one up-down end (either the upper or lower end) is placed on an outer side of the other end in the vehicle width direction with respect to a vertical plane which is orthogonal to the crankshaft. The cover attachment surface has female screw holes which are orthogonal to the cover attachment surface, and the transmission cover is attached to the cover attachment surface by a plurality of bolts screwed into the female screw holes.

According to the above configuration, when the transmission cover is detached, the bolts are removed toward the obliquely upper side or the obliquely lower side of the transmission cover. Thus, even when other parts are arranged in the vicinity of boss portions for the bolts, contact between other parts or the like and the bolts can be avoided. Therefore, at the time of the maintenance and the replacement of the V belt, the transmission cover can be easily attached and detached.

The present invention can be provided with the following characteristics in addition to the above configuration.

(a) The cover attachment surface is inclined in such a manner that a lower end of the cover attachment surface is placed on the outer side of an upper end in the vehicle width direction.

According to the above configuration (a), at the time of attaching and detaching the transmission cover, an operator can attach and detach the bolts and the transmission cover from the obliquely upper side of the transmission cover. Thus, for example when other members exist in the vicinity of the boss portions in a lower end of the transmission cover, the bolts can be removed without contact with other members. As a matter of course, even in a case where the transmission cover is attached, the bolts can be similarly attached without contact with other members. While ensuring removal and insertion tasks of the bolts as described above, an attachment position of the V-belt type continuously variable transmission can be lowered. Thereby, the gravity center of the vehicle can be lowered.

(b) The V-belt type continuously variable transmission is arranged in the vicinity of one end of a vehicle body frame in the vehicle width direction.

According to the above configuration (b), at the time of attaching and detaching the transmission cover, the transmission cover and the bolts can be easily accessed from the side of the vehicle. Thus, the attachment and detachment tasks of the transmission cover are further easily performed.

(c) The transmission case is formed as a separate body from the crankcase, and the crankcase includes a case attachment portion having a transmission case attachment surface formed in the vertical plane which is orthogonal to the crankshaft. The transmission case is attached to the transmission case attachment surface by a plurality of bolts which are parallel to the vehicle width direction.

According to the above configuration (c), in a case where the transmission case is a separate body from the crankcase, the transmission case can be precisely attached to the crankcase, and mechanical processing of the case attachment surface is readily performed.

(d) The transmission cover is formed of a resin material.

According to the above configuration (d), weight of the V-belt type continuously variable transmission can be reduced. Due to the decrease in weight, the attachment and detachment tasks of the transmission cover also become easy.

(e) As another example, the transmission cover is formed of a metal material. For example, the transmission cover is formed of aluminum or an aluminum alloy member.

According to the above configuration (e), one end of a drive pulley shaft of the V-belt type continuously variable transmission can be supported by the metal transmission cover of aluminum or the like.

BRIEF DESCRIPTION OF THE DRAWINGS

FIG. 3 is a front view of the V-belt type continuously variable transmission of FIG. 1;

FIG. 4 is a front view of the V-belt type continuously variable transmission of FIG. 1 in a state that a transmission case main body and a transmission cover are detached;

FIG. 5 is a perspective view in which the V-belt type continuously variable transmission of FIG. 1 is seen from the left upper side;

DETAILED DESCRIPTION OF THE INVENTION

Embodiment of the Invention

FIGS. 1 to 9 show an engine for utility vehicle provided with a V-belt type continuously variable transmission according to the present invention, and one embodiment of the present invention will be described based on these figures. It should be noted that for convenience of illustration, the front and rear direction of a vehicle is called as the front and rear direction of the engine and other parts, and the left and right sides seen from a passenger in the vehicle (left and right sides seen from the rear side of the vehicle) in the vehicle width direction are called as the left and right sides of the vehicle, the engine, and other parts in the following description.

Figure 1:
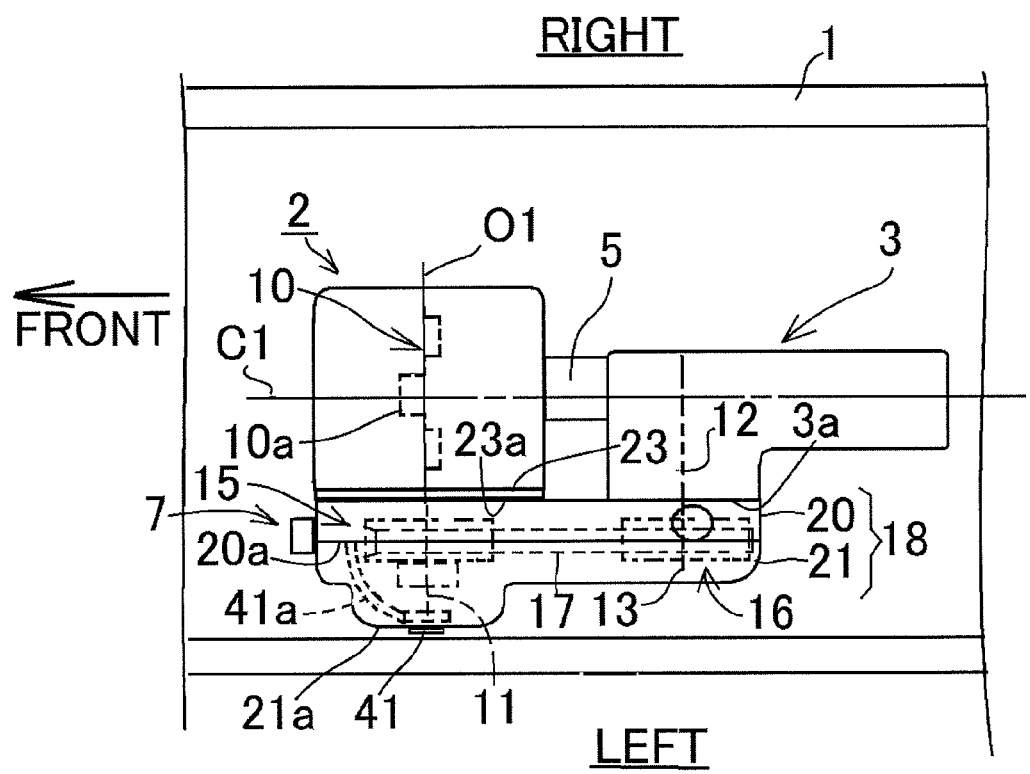
FIG. 1 is a schematic plan view of an engine for a utility vehicle provided with a V-belt type continuously variable transmission according to the present invention.

FIG. 1 is a plan view of the engine for the utility vehicle provided with the V-belt type continuously variable transmission. A vehicle body frame 1 of the utility vehicle is formed into a cubic shape elongated in the front and rear direction, and an engine 2 and a gear type transmission 3 are arranged in the vehicle body frame 1. The gear type transmission 3 is formed as a separate body from the engine 2 and arranged behind the engine 2. A rear surface of the engine 2 and a front surface of the gear type transmission 3 are rigidly coupled by a coupling bracket 5.

The engine 2 is a parallel 3-cylinder engine in which three cylinders are arranged in line in the vehicle width direction (lateral direction). A crankshaft 10 is substantially horizontally arranged in parallel with the vehicle width direction. The entire engine 2 is arranged in such a manner that a center crank portion 10a of the crankshaft 10 is substantially positioned on a center line C1 of the vehicle width direction of the vehicle body frame 1. The coupling bracket 5 and the gear type transmission 3 are also arranged so as to be positioned on the center line C1 of the vehicle body frame 1.

A V-belt type continuously variable transmission 7 is arranged so as to range from a left end surface of the engine 2 to a left end surface of a front part of the gear type transmission 3. The V-belt type continuously variable transmission 7 includes a transmission drive shaft 11 coupled to a left end of the crankshaft 10, a transmission driven shaft 13 coupled to a left end of an input shaft 12 of the gear type transmission 3, a drive pulley assembly 15 installed on an outer circumferential surface of the drive shaft 11, a driven pulley assembly 16 installed on an outer circumferential surface of the driven shaft 13, a V belt 17 looped over both the pulley assemblies 15, 16, and a transmission case assembly 18 covering the drive pulley assembly 15 and the driven pulley assembly 16. The V-belt type continuously variable transmission 7 continuously varies rotation of the crankshaft 10 and transmits the varied rotation to the input shaft 12 of the gear type transmission 3.

The transmission case assembly 18 includes an aluminum or aluminum-alloy transmission case main body 20 and a resin transmission cover 21. A front part of the transmission case main body 20 is attached to a case attachment surface 23a of a coupling plate 23 combined with a left end surface of a crankcase 2a of the engine 2, and a rear part of the transmission case main body 20 is attached to a case attachment surface 3a formed in a left end of the front part of the gear type transmission 3. The transmission cover 21 is attached to a cover attachment surface 20a formed in a left end of the transmission case main body 20. It should be noted that metal other than aluminum or an aluminum alloy can also be used for the transmission case main body 20.

Figure 2:
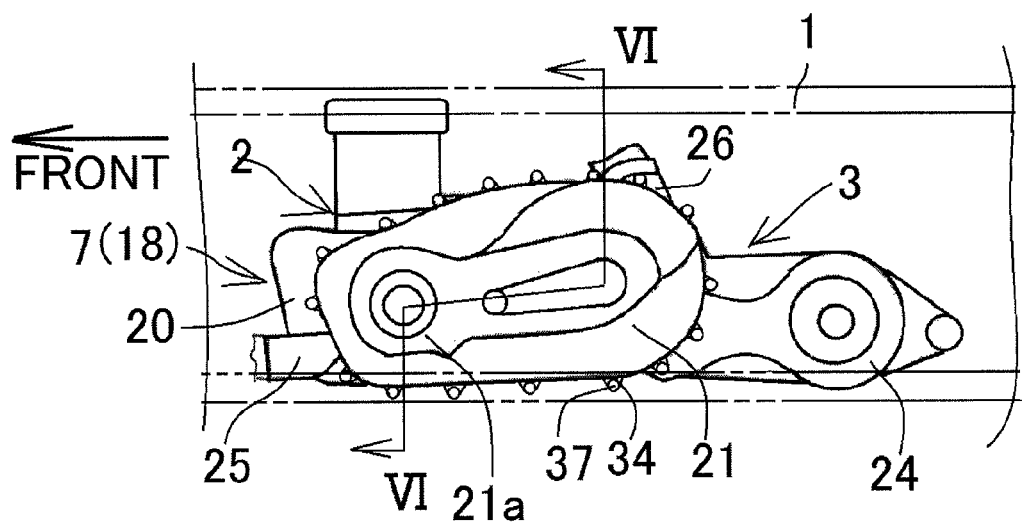
FIG. 2 is a left side view of the V-belt type continuously variable transmission of FIG. 1.

FIG. 2 is a side view of FIG. 1. A lower end of the engine 2, a lower end of the gear type transmission 3, and a lower end of the V-belt type continuously variable transmission 7 are set at the substantially same height, and a final reducer 24 for rear wheels is provided in a rear end of the gear type transmission 3. A cooling air intake port 25 is formed in a front end of the transmission case main body 20, and a cooling air discharge port 26 is formed in an upper part of a rear part of the transmission case main body 20.

FIG. 3 is a front view of the engine 2 and the V-belt type continuously variable transmission 7, and FIG. 4 is an exploded front view of a state that the transmission case main body 20 and the transmission cover 21 are detached from the crankcase 2a. In FIGS. 3 and 4, a plate attachment surface 2b is formed in a vertical plane which is orthogonal to an axis line O1 of the crankshaft 10 in a left end of the crankcase 2a, and the coupling plate 23 is attached to the plate attachment surface 2b by a plurality of bolts 27. The coupling plate 23 has the case attachment surface 23a in a vertical plane V1 which is orthogonal to the axis line O1 of the crankshaft 10, and the transmission case main body 20 is attached to the case attachment surface 23a by a plurality of bolts 30.

Details will be described. A plurality of nuts 31 is secured to a right side surface of the coupling plate 23 (surface on the side of the crankcase 2a) by welding, while a plurality of boss portions 32 for bolt insertion is formed at positions corresponding to the nuts 31 in a circumference of a case attached surface 20b of the transmission case main body 20. By inserting the bolts 30 into bolt insertion holes of the boss portions 32 and screwing the bolts into the nuts 31, the transmission case main body 20 is attached to the case attachment surface 23a of the coupling plate 23.

The cover attachment surface 20a is formed in the left end of the transmission case main body 20. The cover attachment surface 20a is formed in one plane P1 inclined by a fixed inclination angle $\theta1$ so as to extend downward and outward in the vehicle width direction (leftward) with respect to a vertical plane V2 which is orthogonal to the axis line O1 of the crankshaft 10. A plurality of female screw portions (holes) 33 is formed at intervals in an outer circumference of the cover attachment surface 20a. A female screw hole center line O3 of each of the female screw portions 33 is orthogonal to the cover attachment surface 20a (inclination plane P1).

A plurality of boss portions 34 having bolt insertion holes is formed at positions corresponding to the female screw portions 33 of the transmission case main body 20 in an outer circumference of a cover attached surface 21b of the transmission cover 21. The cover attached surface 21b of the transmission cover 21 is suited to the inclined-shape cover attachment surface 20a of the transmission case main body 20. By screwing the plurality of bolts 37 inserted into the boss portions 34 of the transmission cover 21 into the female screw portions 33 of the transmission case main body 20, the transmission cover 21 is attached to the cover attachment surface 20a of the transmission case main body 20.

In sum, the transmission case main body 20 is attached to the case attachment surface 23a of the vertical coupling plate 23 by the plurality of bolts 30 in substantially parallel with the axis line O1 of the crankshaft 10. Meanwhile, the transmission cover 21 is attached to the cover attachment surface 20a of the transmission case main body 20 by the plurality of bolts 37 inclined in such a manner that outer ends in the vehicle width direction are positioned on the upper side with respect to the axis line O1 of the crankshaft 10. An inclination angle θ1 of the cover attachment surface 20a is set to be about 10° to 30° for example.

FIG. 5 is a perspective view seen from the rear upper side of the V-belt type continuously variable transmission (however, cover attachment bolts are omitted). A front portion 21a of the transmission cover 21 is formed into a dome shape or a partially spherical shape, and protrudes outward in the vehicle width direction (leftward). A circular through hole 40 is formed in a top part of the dome shape front portion 21a. An end portion of a bearing boss portion 41 arranged inside the transmission cover 21 is fitted into the through hole 40, and an end surface of the bearing boss portion 41 is exposed to an exterior from the transmission cover 21.

Figure 6:
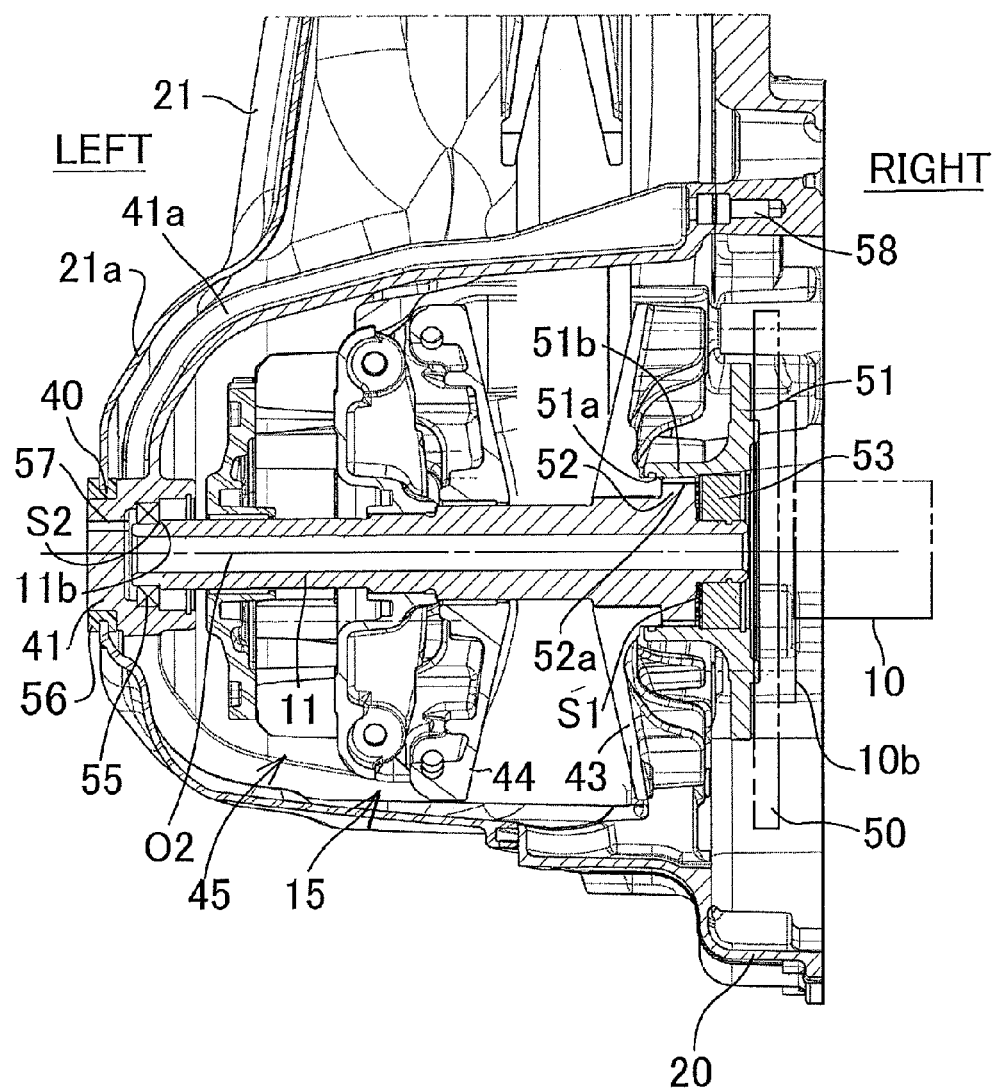
FIG. 6 is an enlarged sectional view by line VI-VI of FIG. 2.

FIG. 6 is an enlarged sectional view by line VI-VI of FIG. 2 showing details of the drive shaft 11 and the drive pulley assembly 15 of the V-belt type continuously variable transmission 7. In FIG. 6, the drive pulley assembly 15 includes a fixed sheave 43 screwed in the vicinity of a right end of the drive shaft 11 so as not to move in the drive shaft direction, a movable sheave 44 fitted to the drive shaft 11 so as to move in the drive shaft direction, and a flyweight type sheave thrust generation mechanism 45.

The crankshaft 10 has a flange portion 10b in the left end. A flywheel 50 is fastened to the flange portion 10b by a plurality of bolts, and a coupling 51 is fastened to the flywheel 50 by a plurality of bolts. The coupling 51 is integrally provided with a tube portion 51b having inner spline teeth 51a, while an extended diameter portion 52 having outer spline teeth 52a is formed in the right end of the drive shaft 11. By spline-fitting the outer spline teeth 52a of the drive shaft 11 to the inner spline teeth 51a of the coupling 51, the drive shaft 11 is coupled to the coupling 51 so as to move in the axial direction and transmit rotation force.

In the embodiment, an axially movable amount of the drive shaft 11 is regulated within a space S1 between an axial end surface of a collar 53 fitted to an inner circumferential surface of the tube portion 51b of the coupling 51 and an end surface of the extended diameter portion 52 of the drive shaft 11. The space S1 is about 1 to several millimeters.

Further, the outer spline teeth 52a and the inner spline teeth 51a are spline-fitted while having a play in the radial direction to such an extent that an axis line O2 of the drive shaft 11 is permitted to fall slightly with respect to the axis line O1 of the crankshaft 10.

A left end of the drive shaft 11 is rotatably supported on an inner circumferential surface of the aluminum or aluminum-alloy bearing boss portion 41 via a bearing 55. In accordance with the fact that the right end of the drive shaft 11 is spline-fitted to the coupling 51 so as to move in the axial direction by the predetermined amount S1 as described above, a right end surface of the bearing 55 and a step surface 11b formed in the left end of the drive shaft 11 face each other in the axial direction across a space S2 substantially corresponding to the space S1.

An annular elastic packing 56 is fitted to an inner circumferential edge of the through hole 40 of the transmission cover 21, and an outer circumferential surface of the bearing boss portion 41 is fitted to an inner circumferential surface of the packing 56. An all hole 57 opening in an end surface exposed to the outer side of the transmission cover 21 is formed in the bearing boss portion 41, and the oil hole 57 passes through the bearing boss portion 41 and opens in the vicinity of the bearing 55. That is, grease can be charged into the bearing 55 from the exterior via the oil hole 57.

The bearing boss portion 41 integrally has a plurality of support legs 41a. The support legs 41a are extended rightward in a curved shape along an inner circumferential surface of the dome shape front portion 21a of the transmission cover 21, and fixed to the transmission case main body 20 by bolts 58.

Figure 7:
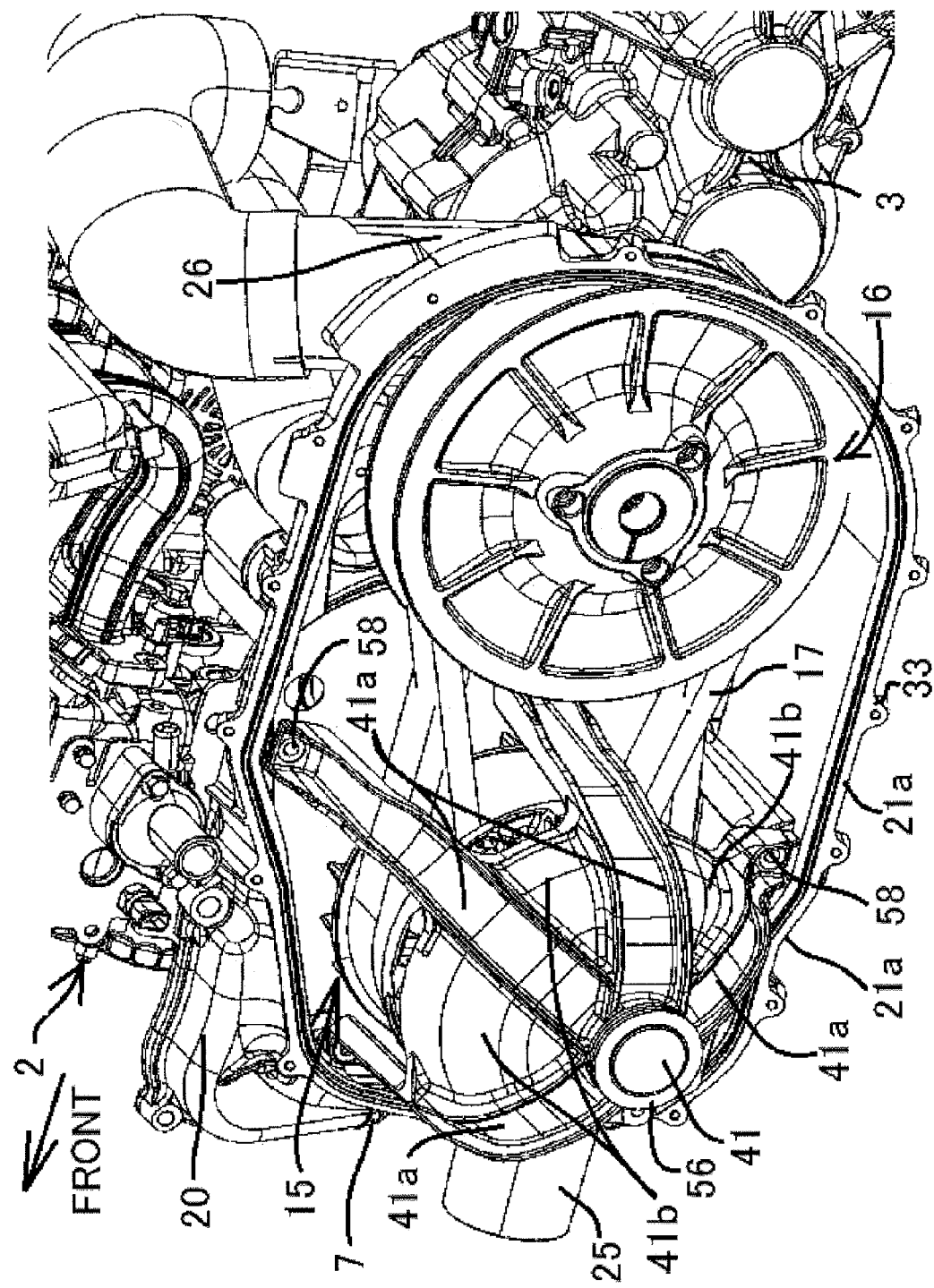
FIG. 7 is a perspective view in which the V-belt type continuously variable transmission of FIG. 1 in a state that the transmission cover is detached is seen from the left upper side.

FIG. 7 is a perspective view in which the V-belt type continuously variable transmission 7 in a state that the transmission cover 21 is detached is seen from the left upper side. In the embodiment, the bearing boss portion 41 integrally has the four support legs 41a. The four support legs 41a are arranged at four points of the drive pulley assembly 15 including a front upper part, a rear upper part, a rear part, and a rear lower part, and any of the support legs 41a is formed to have a U shape section. Further, curved parts of the support legs 41a are integrally coupled by partially spherical ceiling walls 41b.

Figure 8:
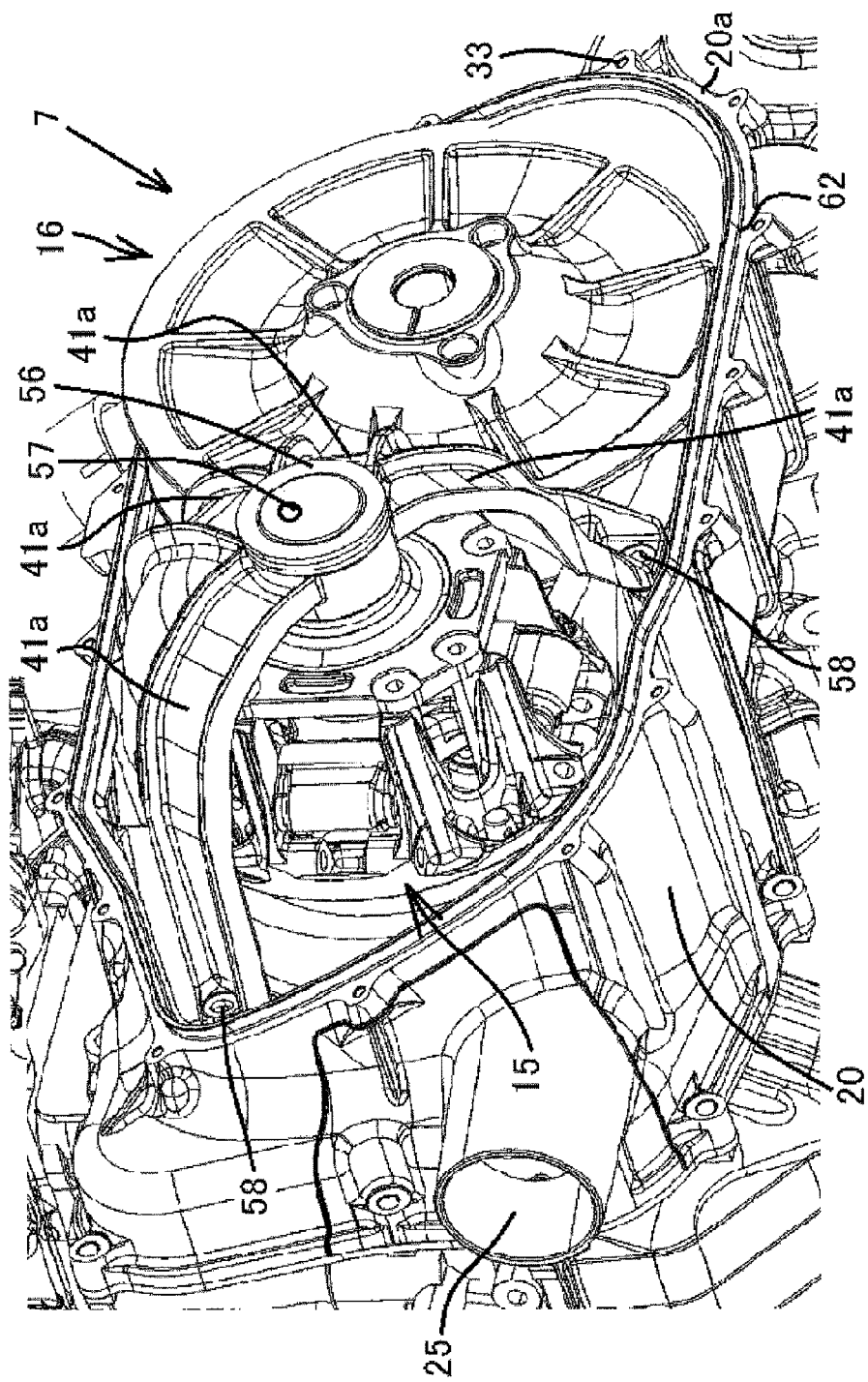
FIG. 8 is a perspective view in which the V-belt type continuously variable transmission of FIG. 1 in a state that the transmission cover is detached is seen from the left lower side.

FIG. 8 is a perspective view in which the V-belt type continuously variable transmission 7 in a state that the transmission cover 21 is detached is seen from the left-front lower side. In a region of a front lower part of the drive shaft 11, the support legs 41a and the ceiling walls 41b are not formed over a range of substantially 180° about the drive shaft 11.

Figure 9:
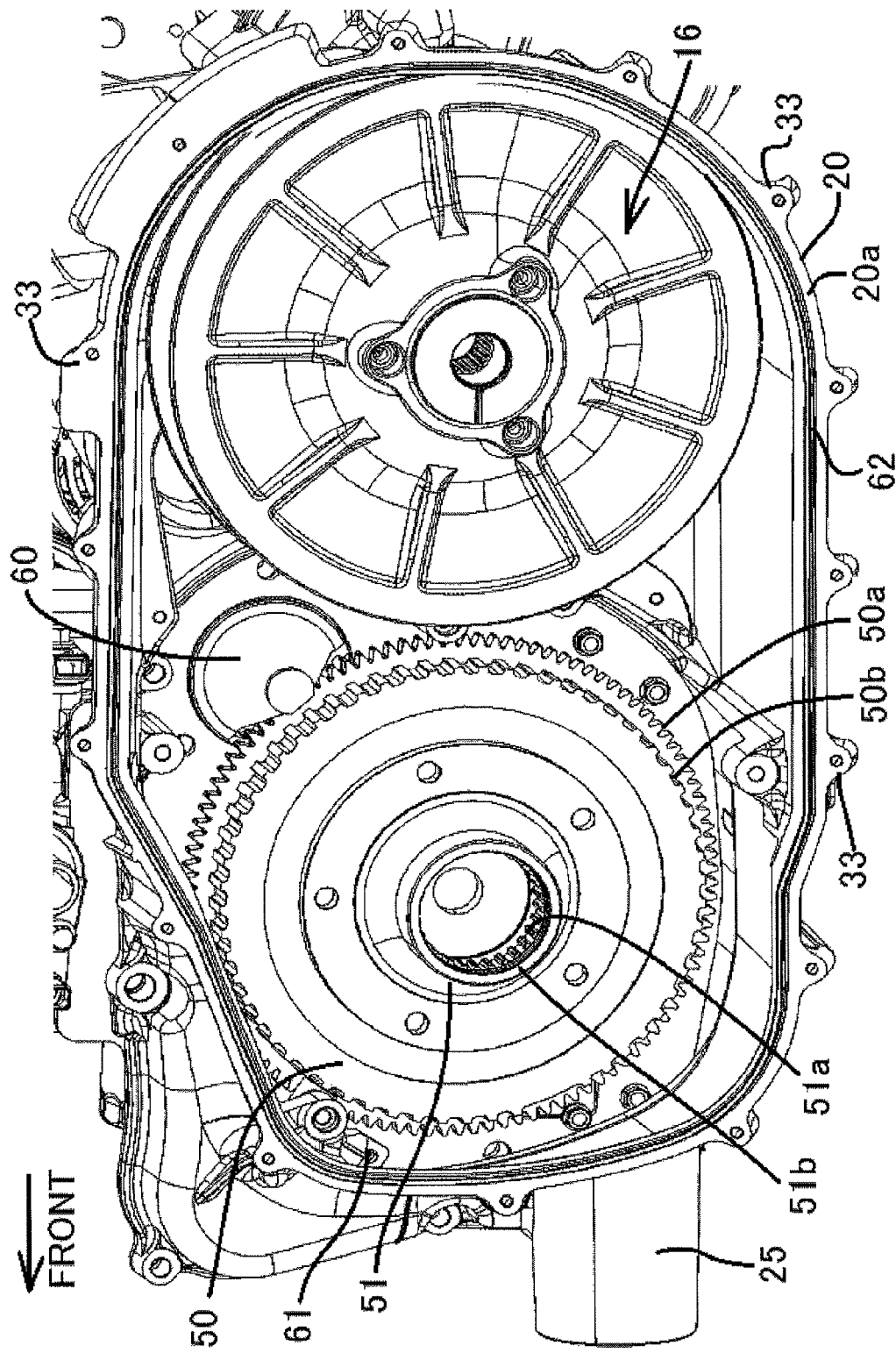
FIG. 9 is a perspective view in which the V-belt type continuously variable transmission of FIG. 1 in a state that the transmission cover and a drive pulley assembly are detached is seen from the left rear side.

FIG. 9 is a perspective view in which the V-belt type continuously variable transmission 7 in a state that the transmission cover 21 and the drive pulley assembly 15 are detached is seen from the left upper side, clearly showing structures of the flywheel 50 and the coupling 51. On an outer circumferential surface of the flywheel 50, a starter gear 50a to be meshed with a pinion gear of a starter motor 60, and a concave and convex portion 50b for sensor reading facing a rotation sensor 61 are formed. On the cover attachment surface 20a of the transmission case main body 20, a projection 62 is formed for fitting a trim seal.

Regarding a pitch between the plurality of female screw portions 33 formed in an outer circumferential end of the transmission case main body 20, a pitch between the female screw portions 33 arranged in a front end and an upper end of a circumference of the flywheel 50 is formed to be wider than a pitch between other female screw portions 33.

Effects According to Embodiment (a) In FIGS. 1 and 2, in a case where the transmission cover 21 is detached for belt replacement or maintenance, an operator places himself/herself on the side of the vehicle, and removes the plurality of bolts 37 for the transmission cover 21 toward the obliquely upper side. Therefore, even when pipe members of the vehicle body frame 1 are placed on the side of the boss portions 34 in a lower end of the transmission cover 21, the bolts 37 can be removed without contact with the vehicle body frame 1.

Specifically, the cover attachment surface 20a formed in the transmission case main body 20 is inclined by the angle θ1 downward and outward in the vehicle width direction with respect to the vertical plane V2 which is orthogonal to the axis line O1 of the crankshaft 10. Thus, even when the V-belt type continuously variable transmission 7 is arranged in such a manner that the lower end of the transmission cover 21 comes near a lower frame member of the vehicle body frame 1, the bolts 37 can be removed without contact with the lower frame member of the vehicle body frame 1. As a result, while the engine 2 provided with the V-belt type continuously variable transmission 7 is compactly arranged in the vehicle body frame 1, an attachment and detachment property of the transmission cover 21 is ensured.

(b) Since the V-belt type continuously variable transmission 7 is arranged in the vicinity of one end of the vehicle body frame 1 in the vehicle width direction, at the time of attaching and detaching the transmission cover 21, the transmission cover 21 and the bolts 37 can be easily accessed from the side of the vehicle. Thus, attachment and detachment tasks of the transmission cover 21 are further easily performed.

(c) In a state that the boss portions 34 in the lower end of the transmission cover 21 are near the lower frame member of the vehicle body frame 1, a position of the V-belt type continuously variable transmission 7 in the vehicle body frame 1 can be lowered. Thus, the gravity center of the vehicle can also be lowered.

(d) In the structure that the transmission case 20 is formed as a separate body from the crankcase 2a, the coupling plate 23 attached to the crankcase 2a has the case attachment surface 23a in the vertical plane V1 which is orthogonal to the crankshaft 10. Thus, at the time of attaching the transmission case, position matching of the transmission case 20 with respect to the crankcase 2a is easily performed. Mechanical processing of the case attachment surface 23a is also readily performed.

(e) Since the transmission cover 21 is formed of a resin material, weight of the V-belt type continuously variable transmission 7 can be reduced, and due to a decrease in weight, the attachment and detachment tasks of the transmission case cover 21 also become easy.

Other Embodiments (1) In the above embodiment, the transmission cover 21 is formed of a resin material. However, the transmission cover 21 can also be formed of aluminum or an aluminum alloy material as well as the transmission case main body 20. In this case, rigidity of the transmission cover is improved.

(2) The cover attachment surface 20a formed in the transmission case 20 can be an inclination surface in which an upper end is placed outward in the vehicle width direction with respect to the vertical plane V2 which is orthogonal to the axis line O1 of the crankshaft 10. In this case, the V-belt type continuously variable transmission 7 can be arranged in such a manner that the boss portions 34 in the upper end of the transmission cover 21 come near an upper frame member of the vehicle body frame 1 for example, and the bolts 37 are removed toward the obliquely lower side.

(3) The present invention can also be applied to a structure that the transmission case 20 is integrated with the crankcase 2a.

(4) The present invention is not limited to the structure of the above embodiment but includes various modified examples obtained within a range not departing from the content described in the claims.

What is claimed is:

1. A V-belt type continuously variable transmission for a utility vehicle, to be arranged in a side of an engine with respect to a vehicle width direction, the vehicle width direction being orthogonal to a vehicle length direction extending from a front of the vehicle to a rear of the vehicle, the engine having a crankshaft parallel to the vehicle width direction, said variable transmission comprising:
   a transmission case assembly covering a drive pulley assembly and a driven pulley assembly, said transmission case assembly including:
      a transmission case main body in an end of a crankcase with respect to the vehicle width direction, and
      a transmission cover attached to a cover attachment surface formed on an end of only said transmission case main body,
   wherein said cover attachment surface has a first end and a second end opposite said first end, said cover attachment surface extending within only one plane inclined with respect to a vertical plane which is orthogonal to the crankshaft in such a manner that the first end of said cover attachment surface is located on an outer side of the second end of said cover attachment surface in the vehicle width direction, and said cover attachment surface having female screw holes each having a central axis orthogonal to said cover attachment surface, and
   wherein said transmission cover is attached to said cover attachment surface of said transmission case main body by a group of bolts screwed into said female screw holes.

2. The V-belt type continuously variable transmission for a utility vehicle according to claim 1, wherein said cover attachment surface is oriented such that said first end is a lower end of said cover attachment surface and said second end is an upper end of said cover attachment surface, said cover attachment surface being inclined in such a manner that said lower end of said cover attachment surface is located on the outer side of said upper end of said cover attachment surface in the vehicle width direction.

3. The V-belt type continuously variable transmission for a utility vehicle according to claim 1, wherein said variable transmission is arranged within a vehicle body frame and at a location of said vehicle body frame in the vehicle width direction such that said plurality of bolts do not contact said vehicle body frame.

4. The V-belt type continuously variable transmission for a utility vehicle according to claim 1, wherein:
   said group of bolts is a first group of bolts,
   said transmission case assembly is formed as a separate body apart from said crankcase,
   said crankcase includes a case attachment portion having a transmission case attachment surface formed in the vertical plane orthogonal to the crankshaft, and
   said transmission case assembly is attached to the transmission case attachment surface by a second group of bolts parallel to the vehicle width direction.

5. The V-belt type continuously variable transmission for a utility vehicle according to claim 1, wherein said transmission cover is formed of a resin material.

6. The V-belt type continuously variable transmission for a utility vehicle according to claim 1, wherein said transmission cover is formed of a metal material.

7. The V-belt type continuously variable transmission for a utility vehicle according to claim 1, wherein said end of said transmission case main body is an end of said transmission case main body relative to a longitudinal axis of said crankshaft.

\* \* \* \* \*